Aug. 26, 1969  W. RIEDEL ET AL  3,462,974

FRICTION-TYPE COUPLING

Filed Dec. 27, 1967

INVENTORS:
Wolfgang Riedel
Siegbert Luz

BY *Michael S. Striker* their Attorney

United States Patent Office 3,462,974
Patented Aug. 26, 1969

1

3,462,974
FRICTION-TYPE COUPLING
Wolfgang Riedel, Winnenden, and Siegbert Luz, Neustadt, Germany, assignors to Robert Bosch Elektronik und Photokino G.m.b.H., Stuttgart, Germany
Filed Dec. 27, 1967, Ser. No. 693,840
Claims priority, application Germany, Jan. 7, 1967,
B 90,645
Int. Cl. F16d 7/02
U.S. Cl. 64—30                    10 Claims

ABSTRACT OF THE DISCLOSURE

A friction-type coupling wherein a rotary driving part transmits torque to a coaxial rotary driven part through the intermediary of a unit comprising two mirror symmetrical shoe members extending into a circumferential groove of the driving part opposite each other and having their end portions articulately coupled with two connecting members. The shoe members consist of elastomeric material if the connecting members are rigid or vice versa, and the elastomeric members are installed under initial stress so that the median portions of shoe members are biased against the surface bounding the groove and normally share rotary movements of the driving part. The unit including the shoe members and connecting members is connected with the driven part so that the latter rotates when the friction between the shoe members and the driving part suffices to cause the unit to shart rotary movements of the driving part.

Background of the invention

The present invention relates to couplings in general, and more particularly to improvements in friction-type couplings which may be utilized for transmission of torque from a rotary driving part to a rotary driven part, especially for transmission of torque to reels for motion picture film, magnetic tape or analogous band-shaped or rope-like carriers of intelligence.

German Utility Model No. 1,442,011 discloses a friction-type coupling wherein a forked torque transmitting member comprises two elastic prongs which bear against a rotary driving part and are arranged to transmit torque to a rotary driven part. The prongs consist of relatively stiff spring wire and are mounted in prestressed condition to remain in frictional engagement with the surface bounding a groove in the driving part.

A serious drawback of the just described coupling is that the magnitude of torque fluctuates within a rather wide range and that the torque decreases considerably with use. If such a coupling is used to drive the takeup reel in a motion picture projector, the convolutions of film on the core of the reel are likely to slide with reference to each other and to damage the coated side of the film. Furthermore, fluctuations in torque can affect the quality of projected images and cause excessive wear on the coupling so that the latter is incapable of transporting the film when the weight of the takeup reel increases.

The main reason for the above outlined deficiencies of conventional couplings is believed to be that the prongs of the torque transmitting yoke are only slightly elastic. This renders it necessary to machine the parts of the coupling with a high degree of precision. Even minimal misalignment of prongs with reference to a plane which is normal to the axis of rotation of the driving and driven parts affects the magnitude of friction to a very high degree. The same applies if the surface engaged by the prongs is rough or out of round. Minimal wear on such surface results in greatly reduced friction and renders it necessary to replace certain parts of or the entire coupling.

Summary of the invention

It is an object of our invention to provide a simple, inexpensive, long-lasting and rugged friction-type coupling which avoids the aforediscussed drawbacks of conventional couplings and which can be used with particular advantage for transmission of torque between rotary driving and driven parts in motion picture projectors, tape recorders and like apparatus.

Another object of the invention is to provide a friction-type coupling which can be readily adjusted to transmit torque of desired magnitude and wherein such adjustment can be carried out without necessitating even partial dismantling of the coupling.

A further object of the invention is to provide a friction-type coupling which can be assembled of simple parts and which can be used in presently known film or tape transporting apparatus without necessitating substantial alterations in the design and/or operation of such apparatus.

An additional object of the invention is to provide a novel and improved torque transmitting unit between the driving and driven parts of a friction-type coupling.

A concomitant object of our invention is to provide a friction-type coupling whose parts need not be machined with a high degree of precision.

In its simplest form, the improved friction-type coupling comprises coaxial rotary driving and driven parts one of which is provided with an external groove, preferably with a circumferentially complete groove located in a plane which is normal to the common axis of such parts, and a novel torque transmitting unit including two discrete shoe members each having two end portions and a median portion extending into the groove opposite the other median portion and two connecting members each secured to one end portion of each shoe member. At least one of the members in the torque transmitting unit consists of elastomeric material and is under stress to bias the median portions of the shoe members against the surface surrounding the groove in the one rotary part. The torque transmitting unit is connected with and shares the movements of the other rotary part.

For example, at least one of the connecting members may constitute a helical spring which is installed under tensional stress. Alternatively, at least one of the shoe members may consist of spring wire or the like. It is also possible to employ an elastic shoe member and an elastic connecting member.

The novel features which are considered as characteristic of the invention are set forth in particular in the appended claims. The improved friction-type coupling itself, however, both as to its construction and its mode of operation, together with additional features and advantages thereof, will be best understood upon perusal of the following detailed description of certain specific embodiments with reference to the accompanying drawing.

Description of the preferred embodiments

Figure 1:
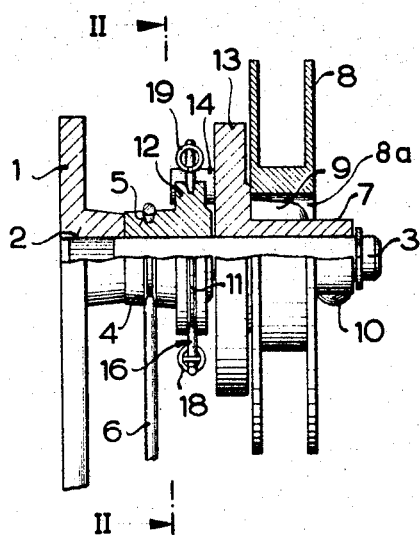
FIG. 1 is a partly elevational and partly axial sectional view of a friction-type coupling which embodies one form of our invention.

FIG. 1 illustrates a portion of a motion picture projector whose housing comprises a wall 1 having a bore 2 receiving one end of a stub shaft 3. The latter does not rotate with reference to the wall 1 and carries a rotatable sheave 4 which constitutes the driving part of our friction-type coupling. This sheave 4 has a circumferential groove 5 for a belt or rope 6 which is driven by the motor of the projector and rotates the sheave 4 in order to drive a takeup reel 8. The reel 8 is coupled to a sleeve 7 which constitutes the driven part of the coupling and is freely rotatable on the shaft 3. A radial projection 9 of the sleeve 7 extends into an internal axially parallel slot 8a in the core of the reel 8 to insure that the latter shares all angular movements of the sleeve. A spring biased spherical detent 10 on the sleeve 7 prevents accidental separation of the reel 8 by holding the reel against axial movement in a direction away from the sheave 4.

Figure 2:
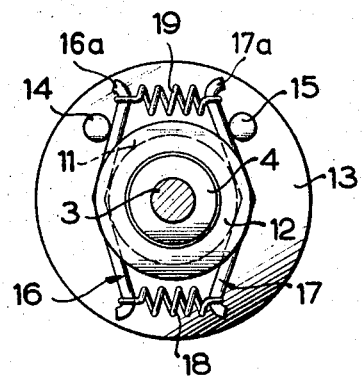
FIG. 2 is a transverse sectional view as seen in the direction of arrows from the line II—II of FIG. 1.

The improved torque transmitting unit which serves to rotate the sleeve 7 in response to rotation of the sheave 4 is best shown in FIG. 2. The sheave 4 has a disk-shaped larger-diameter end portion 12 which is adjacent to a flange 13 of the sleeve 7 and is provided with a circumferentially complete groove 11. This groove receives the median portions of two rigid or substantially rigid shoe members 16, 17 which are mirror symmetrical with reference to each other and have pairs of hook-shaped end portions 16a, 17a detachably and articulately coupled with the terminals of two connecting members here shown as prestressed helical springs 18, 19. Projections or posts 14, 15 provided on the flange 13 of the sleeve 7 straddle the shoe members 16, 17 to insure that the unit including the parts 16 to 19 shares all angular movements of the sleeve or, more accurately stated, that the sleeve 7 rotates whenever the unit including the members 16 to 19 rotates with the sheave 4. The shoe members 16, 17 may consist of relatively stiff metallic wire and their median portions comprise pairs of mutually inclined arms which make an obtuse angle with each other. The helical springs 18, 19 could be replaced by other types of elastomeric connecting members, for example, by rubber bands or the like. Also, the bias of the spring 18 need not be the same as that of the spring 19. Since the springs 18, 19 are readily detachable from the shoe members 16, 17, the magnitude of torque which the sheave 4 can transmit to the sleeve 7 and hence to the reel 8 can be selected at will, merely by replacing the springs 18, 19 with differently dimensioned and/or stressed springs.

Figure 3:
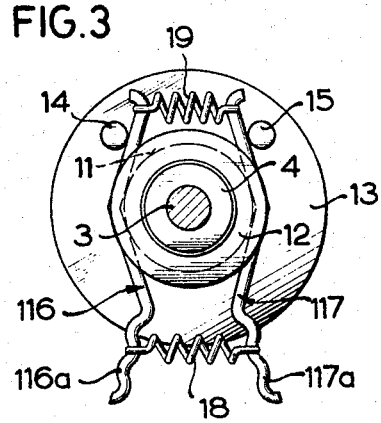
FIG. 3 is a similar transverse sectional view of a slightly modified coupling.

Another mode of varying friction between the sheave 4 and the shoe members of the torque transmitting unit is illustrated in FIG. 3. The friction-type coupling of FIG. 3 is practically identical with that of FIGS. 1 and 2 with the sole exception that one end portion 116a, 117a of each of the shoe members 116, 117 is formed as a corrugated or meandering body which provides at least two positions for retention of end convolutions or terminals of the spring 18. Thus, the terminals of the spring 18 are adjustable with reference to the end portions 116a, 117a to thereby regulate friction between the roof-shaped median portions of the shoe members 116, 117 and the surface bounding the groove 11 in the disk-shaped portion 12 of the sheave 4. The friction will decrease if the spring 18 is moved nearer to the common axis of the sheave 4 and sleeve 7, but such friction will increase if the spring 18 is moved away from the common axis because the spring 18 is then subjected to a greater tensional stress. It is clear that the upper end portions of the shoe members 116, 117 can be formed in the same way as the lower end portions 116a, 117a to thus allow for adjustments of the spring 19.

Figure 4:
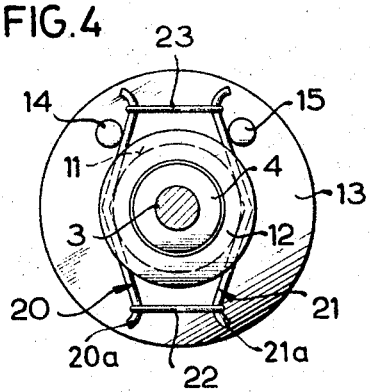
FIG. 4 is a similar transverse sectional view of a third friction-type coupling.

FIG. 4 illustrates a friction-type coupling which includes a modified torque transmitting unit. This unit comprises two elastomeric shoe members 20, 21 and two substantially stiff connecting members 22, 23. For example, the shoe members 20, 21 may consist of spring steel and are preferably of circular cross-sectional outline. The configuration and composition of connecting members 22, 23 are such that they do not yield to tensional stresses. The hook-shaped end portions of the shoe members 20, 21 are shown at 20a, 21a.

Due to roof-shaped configuration of the median portions of shoe members, each of these members is in two-point contact with the surfaces bounding the respective groove 11. The area of contact is normally greater if the shoe members consist of elastomeric material.

The mounting of torque transmitting units on the sleeve 7 and sheave 4 is very simple and consumes little time. The median portions of shoe members 16, 17 or 116, 117 or 20, 21 are placed into the respective groove 11 opposite each other and the connecting members 18, 19 or 22, 23 are coupled to their end portions, either in response to stressing of the connecting members (FIGS. 1 to 3) or in response to flexing of the shoe members (FIG. 4). The median portions of the shoe members are then biased against the sheave 4 with a desired force which suffices to transmit torque to the sleeve 7 unless the reel 8 offers an excessive resistance to rotation. The springs 18, 19 enable the median portions of shoe members 16, 17 or 116, 117 to find optimum positions with reference to the sheave 4, and the same applies for the embodiment of FIG. 4 wherein the shoe members 20, 21 consist of elastomeric material.

It was found that our friction-type coupling is capable of transmitting torque at a constant rate and for long periods of time. This insures uninterrupted and smooth transport of film or tape without jerky movements and without damage to the exposed surfaces of conveyed material. Such advantages are attributed to the fact that the torque transmitting unit of FIGS. 1-2, 3 or 4 forms a substantially rectangular and strongly elastic polygon with articulate connections between its members. The members of the torque transmitting unit and/or the surface surrounding the groove 11 in the sheave 4 need not be machined with utmost precision, because the elasticity of the torque transmitting unit enables its members to automatically assume optimum positions with reference to each other and with reference to the rotary driving and driven parts. This holds true when the coupling is new as well as after prolonged use and upon considerable wear on the part which is provided with the groove for the median portions of shoe members. It is further clear that the torque transmitting unit can be non-rotatably mounted on the driving part and that the groove for the median portions of shoe members can be provided on the driven part of the coupling.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. A friction-type coupling, particularly for transmitting torque to reels for motion picture film or the like, comprising coaxial rotary driving and driven parts one of which is provided with an external groove; and a torque transmitting unit including two discrete shoe members each having two end portions and a median portion extending into said groove opposite the other median portion, and two connecting members, one of said connecting members being secured to one end portion of each shoe member and the other connecting member being secured to the other end portion of each shoe member, at least one of said members consisting of elastomeric material and being under stress to bias said shoe members against said one part, said unit being connected with and sharing rotary movements of the other part.

2. A coupling as defined in claim 1, wherein said shoe members are substantially rigid and wherein at least one of said connecting members is under tensional stress.

3. A coupling as defined in claim 2, wherein said connecting members are helical springs having terminals detachably coupled to the respective end portions of said shoe members.

4. A coupling as defined in claim 1, wherein said one member is one of said shoe members.

5. A coupling as defined in claim 4, wherein both said shoe members consist of elastomeric material and said connecting members are substantially rigid.

6. A coupling as defined in claim 1, wherein said one end portions of said shoe members resemble hooks and are detachably coupled to the respective connecting members.

7. A coupling as defined in claim 1, wherein at least one of said connecting members is adjustable with reference to the respective end portions of said shoe members to thereby change the bias upon said shoe members.

8. A coupling as defined in claim 1, wherein the median portion of each of said shoe members comprises two mutually inclined arms making an obtuse angle.

9. A coupling as defined in claim 1, wherein said other rotary part comprises at least one eccentric projection engaging one of said shoe members so that said one shoe member rotates said other part through the intermediary of said projection or vice versa.

10. A coupling as defined in claim 1, wherein said groove is a circumferentially complete groove and said shoe members are substantially mirror symmetrical with reference to each other.

References Cited
UNITED STATES PATENTS

| | | | |
|---|---|---|---|
| 558,191 | 4/1896 | Lund | 64—30 |
| 1,490,951 | 4/1924 | Werner | 64—30 |
| 2,199,999 | 5/1940 | Jensen et al. | 64—30 |
| 2,904,977 | 9/1959 | Caspari | 64—30 |
| 2,954,224 | 9/1960 | Schneider et al. | |

HALL C. COE, Primary Examiner